United States Patent [19]

Braca et al.

[11] Patent Number: 5,494,951
[45] Date of Patent: Feb. 27, 1996

[54] COMPOSITIONS FOR POLYOLEFIN FIBERS HAVING IMPROVED FLAME-RESISTANCE AND NO CORROSIVE PROPERTIES

[75] Inventors: Giancarlo Braca, Terni; Guido Bertelli, Ferrara; Leonardo Spagnoli, Terni, all of Italy

[73] Assignee: Montell North America Inc., Wilmington, Del.

[21] Appl. No.: 286,022

[22] Filed: Aug. 4, 1994

[30] Foreign Application Priority Data

Aug. 11, 1993 [IT] Italy .................. 93 A 001816

[51] Int. Cl.⁶ ........................................... C08K 5/15
[52] U.S. Cl. ................. 524/114; 524/93; 524/100; 524/177; 524/204; 524/410
[58] Field of Search ................... 524/114, 93, 100, 524/177, 204, 410

[56] References Cited

U.S. PATENT DOCUMENTS

| | | | |
|---|---|---|---|
| 3,457,204 | 7/1969 | Burger | 260/2.5 |
| 3,914,329 | 10/1975 | Naarmann et al. | 260/668 |
| 4,798,857 | 1/1989 | Bertelli et al. | 524/93 |
| 5,158,992 | 10/1992 | Caselli et al. | 523/207 |
| 5,166,235 | 11/1992 | Bertelli et al. | 524/93 |
| 5,298,552 | 3/1994 | Borghi et al. | 524/524 |

FOREIGN PATENT DOCUMENTS

| | | |
|---|---|---|
| 1469137 | 3/1977 | United Kingdom . |
| 1469138 | 3/1977 | United Kingdom . |

*Primary Examiner*—Peter D. Mulcahy

[57] ABSTRACT

An olefin polymer composition is disclosed which contains (by weight):

(a) from 0.3 to 3% of a complex of general formula:

$$R.(MeX_3)_y$$

wherein R is an amine; Me is bismuth or antimony; X is chlorine or bromine; y is a number from 0.3 to 4.0;

(b) from 0.1 to 1% of poly(1,4-diisopropylbenzene);

(c) from 0.1 to 0.5% of an organic epoxide; the balance to 100% being an olefin polymer.

4 Claims, No Drawings

COMPOSITIONS FOR POLYOLEFIN FIBERS HAVING IMPROVED FLAME-RESISTANCE AND NO CORROSIVE PROPERTIES

The present invention relates to compositions for polyolefin fibers having improved flame resistance and no corrosive properties, as well as the fibers obtained from the above mentioned compositions and the process for their production.

As used herein, "fibers" means not only filaments, among which are staple and continuous filament fibers in particular, but also products which are similar to fibers, such as fibrils, monofilaments and raffia.

It is known in the art that, in order to obtain the above mentioned characteristics in the fibers, flame retardant products, such as certain combinations of ammonium salts and organic nitrogen compounds salts with antiacid substances, such as oxides, stearates or silicates of alkali or alkaline-earth metals, can be used.

Complexes of organic compounds, used together with monomeric free-radicals promoters, that can also be used in the preparation of polyolefin fibers and fabrics, are described as flame retardant additives in European patent 273458, in the name of the Applicant. Said compounds consist of complexes of bismuth and/or antimony halides with amines, and have the following general formula:

$$R.(MeX_3)_y$$

wherein R is an amine selected from the group consisting of dicyandiamide, guanamine, 2-guanidinoimidazole, melamine, isophoronediamine and piperazine, which are optionally substituted with an alkyl, aryl or acyl group, and compounds containing from 2 to 9 triazine rings either condensed or bonded to one another with at least one —NH group; Me is bismuth or antimonium; X is chlorine or bromine; y is a number from 0.3 to 4.0.

However, by using blends of said compounds in the preparation of fibers, the problem presented by the corrosivity property caused by the presence of halogenated flame-retardant compounds in the blends cannot be overcome. Said corrosive property, which is obviously undesirable, affects the iron parts of the spinning machines and other apparatuses used in the production of fibers, and those used in the production of articles from said fibers.

Moreover, the fibers obtained from said blends have considerably low flame resistance values (i.e. oxygen indexes) even when high concentrations of flame retardants are used. This latter aspect obviously limits the use of the fibers containing the above mentioned additives to applications where high flame resistant properties are not required.

A new olefin polymer composition has now been found that can be converted into a fiber having good flame resistance and no corrosive property. Said characteristics are conferred on the polyolefin fiber due to a specific selection of flame retardant, free radical promoters and antiacid compounds, which can be added in quantities low enough so that they do not alter the physical/mechanical properties of the polyolefins used to produce in the fibers.

A further advantage, which is a consequence of the use of the compositions of the present invention in the production of fibers, is that fibers with a higher denier are obtained, because during the spinning stage one can avoid the breakage of the fibers, that is caused by the plugging of the holes in the die. In fact said plugging is caused by the granules of the flame retardant compounds present in the polymer. This favorable result is obtained due to the low melt point of the flame retardant compounds used in the compositions of the present invention, which are in the molten state during spinning.

A further advantage derived from the use of the compositions of the present invention, is that it is now also possible to process said compositions at high temperatures (for example at temperature higher than 230° C.). Raising the temperature during the production processes allows increased productivity in said processes. Said temperature increase is possible due to the high thermal stability of the compositions of the present invention, that also results in a considerable decrease in the formation of degradation products, which are troublesome if nothing else.

Therefore, the present invention provides an olefin polymer composition comprising (by weight):

(a) from 0.3 to 3% of a complex of general formula:

$$R.(MeX_3)_y$$

wherein R is an amine selected from the group consisting of dicyandiamide, guanamine, 2-guanidinoimidazole, melamine, isophoronediamine and piperazine, which are optionally substituted with an alkyl, aryl or acyl group, preferably a $C_1$–$C_6$ alkyl, $C_6$–$C_{12}$ aryl, or $C_2$–$C_8$ acyl group and compounds containing from 2 to 9 triazine rings either condensed or bonded to one another with at least one —NH group; Me is bismuth or antimony; X is chlorine or bromine; y is a number from 0.3 to 4.0, preferably 1; (b) from 0.1 to 1% of poly(1,4-diisopropylbenzene) of general formula:

$$H\text{—}[C(CH_3)_2\text{—}(C_6H_4)\text{—}C(CH_3)_2]_n\text{—}H$$

wherein n is a number from 3 to 7;

(c) from 0.1 to 0.5% of an organic epoxide, preferably selected from the epoxidized organic oils;
the balance to 100% being an olefin polymer.

Moreover, the present invention provides the fibers obtained from the above mentioned composition.

Compounds (a), (b), and (c) are present in the olefin polymer compositions preferably in quantities from 0.8 to 1.6%, from 0.2 to 0.6% and from 0.15 to 0.30%, respectively.

Of the R compounds present in complexes (a) the following are preferred: dicyandiamide, guanamine, melamine, and compounds comprising from 2 to 9 triazine rings, either condensed or bonded to one another with at least one —NH group. These latter compounds are known as "melam", "melem", and "melon", for which the following formulas are generally proposed (see "Proceedings of the Second European Symposium on Thermal Analysis" University of Aberdeen U.K., 1–4 September, 1981, Editor David Dollimore): melam:

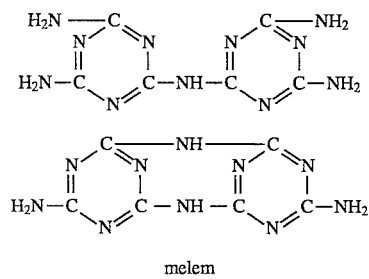

melem

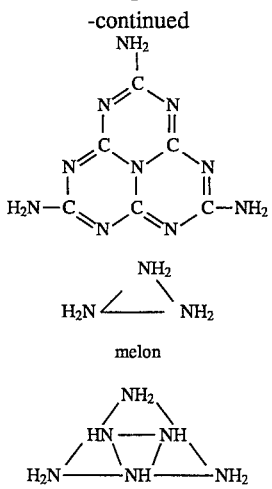

melon

Said compounds can be obtained by heating the dicyandiamide or a triazine at temperatures ranging from 100° to 300° C. or higher; in this manner one obtains the cyclization of the dicyandiamide to triazine rings, and/or the polycondensation of the triazine to the desired degree.

Examples of complexes (a) are: $C_2H_4N_4.BiBr_3$ (dicyandiamide with bismuth tribromide), $C_3H_6N_6.BiBr_3$ (melamine with bismuth tribromide), $C_4H_7N_5.SbBr_3$ (acetoguanamine with antimony tribromide), $2(C_3H_6N_6).BiBr_3$ (bismelamine with bismuth tribromide).

Complexes (a) can be prepared, for example, as described in the above mentioned European patent 273458, by heating a blend of said amines R with a metal halide to temperature ranging from 50° to 150° C., using at least 0.3 moles of the metal halide per mole of amine, or per mole of the primary amine group when the latter is present in the chemical compound.

In compound (b) it is preferable that n is from 6 to 7. Examples of compounds (b) wherein n is comprised within the above mentioned preferable values are marketed by Peroxide-Chemie GmbH under the Interox VP 156 trademark.

Preferred examples of epoxidized organic oils are vegetable epoxidized organic oils, such as linseed oil and soybean oil. The epoxidized linseed oil, for example, is sold by Henche under the EDENOL B 316 trademark.

The olefin polymers comprised in the compositions and the fibers of the present invention are generally selected from:

1) isotactic or mainly isotactic propylene homopolymers, preferably having isotactic index of at least 90;
2) random copolymers of propylene with ethylene and/or $C_4-C_8$ α-olefins, preferably having isotactic index of at least 35;
3) heterophasic polymers comprising (parts and percentages by weight):
   A) from 10 to 60 parts of a propylene homopolymer, or a copolymer of propylene with ethylene and/or a $C_4-C_8$ α-olefin containing more than 80% of propylene and having an isotactic index higher than 80 (Fraction A);
   B) from 3 to 25 parts of a semicrystalline copolymer fraction of ethylene, insoluble in xylene at ambient temperature (Fraction B); and
   C) from 15 to 87 parts of a copolymer fraction of ethylene with propylene and/or a $C_4-C_8$ α-olefin, and optionally minor quantities of diene, said copolymer fraction being soluble in xylene at ambient temperature and containing from 20 to 60% of ethylene or a $C_4-C_8$ α-olefin or combinations thereof (Fraction C);
4) blends of polymers 1) and/or 2) and/or 3).

The $C_4-C_8$ α-olefins which can be present in random copolymers 2) and heterophasic polymer 3) are linear or branched alkenes, and are preferably selected from the following compounds: 1-butene, 1-pentene, 1-hexene, 1-octene, and 4-methyl-1-pentene. Particularly preferred is the 1-butene.

Generally the random copolymers 2) contain a quantity of comonomers ranging from 0.05 to 20% by weight.

Fraction A is preferably present in the heterophasic polymer in quantities ranging from 10 to 50 parts by weight. Moreover, said Fraction A comprises a propylene homopolymer with an isotactic index preferably higher than 90, more preferably from 95 to 98, or the copolymer defined above containing over 85%, preferably from 90 to 99%, of propylene.

Fraction B is present in the heterophasic polymer preferably in quantities ranging from 7 to 15 parts by weight. Generally said Fraction has a crystallinity, determined by way of DSC (Differential Scanning Calorimetry), ranging from about 20 to 60%. The copolymer comprised in said Fraction is preferably selected from the following types of copolymers: ethylene/propylene containing more than 55% of ethylene; ethylene/propylene/$C_4-C_8$ α-olefin containing from 1 to 10% of said α-olefin and from 55 to 98%, preferably from 80 to 95%, of ethylene plus said α-olefin; ethylene/$C_4-C_8$ α-olefin containing from 55 to 98%, preferably from 80 to 95%, of said α-olefin.

Fraction C is present in the heterophasic polymer preferably in quantities ranging from 30 to 75 parts by weight, and is preferably selected from: an ethylene/propylene copolymer containing from 15% to 70% of ethylene, preferably from 20 to 60%; an ethylene/propylene/$C_4-C_8$ α-olefin copolymer containing from 1 to 10% of said α-olefin, preferably from 1 to 5%, wherein the total quantity of ethylene plus the α-olefin ranges from at least 20 to less than 40%; an ethylene/$C_4-C_8$ α-olefin copolymer containing from 20 to less than 40%, preferably from 20 to 38%, more preferably from 25 to 38%, of said α-olefin. The dienes optionally present in the copolymers of said Fraction are generally present in quantities equal to or less than 10%, and are preferably selected from: 1,3-butadiene, 1,4-hexadiene, 1,5-hexadiene and 2-ethylidene-5-norbornene.

The heterophasic propylene polymers are prepared either by mechanically blending components A), B), and C) in the molten state, or by using a sequential polymerization process carried out in two or more stages, and using highly specific Ziegler-Natta catalysts.

Examples of said heterophasic propylene polymers, as well as the catalysts and polymerization processes commonly used for their preparation, are described in published European patent applications n. 400.333 and 472.946.

The polymers to be used for the preparation of the compositions and the fibers of the present invention preferably contain also some stabilizers, such as (percentages by weight):

I) from 0.05 to 0.15% of organic phosphites and/or phosphonites, and/or

II) from 0.5 to 0.15% of one or more phenolic antioxidants, and/or

III) from 0.5 to 0.15% of one or more light stabilizers.

Examples of phosphites that can be used as additives for the polyolefin compositions of the present invention are the following compounds:

tris(2,4-di-tert-butyl phenyl)phosphite, marketed by Ciba Geigy under the trademark Irgafos 168; distearyl pentaerythritol diphosphite, marketed by Borg-Warner Chemical under the trademark Weston 618; 4,4'-butylidenebis(3-methyl-6-tert-butyl phenyl-di-tridecyl)phosphite, marketed by Adeka Argus Chemical under the trademark Mark P; tris(mononodyl phenyl)phosphite; bis(2,4-di-tert-butyl)pentaerythritol diphosphite, marketed by Borg-Warner Chemical under the trademark Ultranox 626.

Preferably the organic phosphonite that can be used as additive for the polyolefin compositions utilized in the present invention is tetrakis(2,4-di-tert-butyl phenyl)4,4'-diphenylene diphosphonite, marketed by Sandoz under the trademark Sandostab P-EPQ.

Examples of phenolic antioxidants preferred as additives in the polyolefin compositions described in the present invention are: tris(4-tert-butyl-3-hydroxy-2,6-dimethylbenzyl)-s-triazine-2,4,6-(1H,3H,5H)-trione, marketed by American Cyanamid under the trademark Cyanox 1790; calcium bi[monoethyl(3,5-di-tert-butyl-4-hydroxy-benzyl)phosphonate]; 1,3,5-tris(3,5-di-tert-butyl-4-hydroxybenzyl)-s-triazine-2,4,6(1H,3H,5H)trione; 1,3,5-trimethyl-2,4,6-tris (3,5-di-tert-butyl-4-hydroxy-benzyl)benzene; pentaerythrityl-tetrakis[3-(3,5-di-tert-butyl-4-hydroxyphenyl)propionate, marketed by Ciba Geigy under the trademarks Irganox 1425, Irganox 3114, Irganox 1330, and Irganox 1010 respectively; 2,6-dimethyl-3-hydroxy-4-tert-butyl benzyl abietate.

Examples of light stabilizers are the compounds pertaining to the benzotriazoles, benzophenols and HALS (Hindered Amine Light Stabilizers) families.

Examples of HALS that can be used for the polyolefins utilized in the present invention are the compounds commercially available under the following trademarks: Chimassorb 944, Chimassorb 905, Tinuvin 770, Tinuvin 992, Tinuvin 622, Tinuvin 144, Spinuvex A36, marketed by Ciba Geigy; Cyasorb UV 3346, marketed by American Cyanamid.

In addition to the above mentioned stabilizers, the polyolefin compositions of the present invention can also contain the usual polymer additives, such as dyes, opacifiers and fillers.

Generally, the polymers used in the present invention have a melt flow rate according to ASTM D-1238, condition L (MFR-L), ranging from 0.5 to 1000 g/10 min., and molecular weight distribution (MWD) values, expressed as $M_w/M_n$, ranging from 3 to 6, preferably from 3.5 to 4.5. $M_w$ (weight average molecular weight) and $M_n$ (number average molecular weight) are determined by gel permeation chromatography (GPC).

The desired MFR-L and MWD values of the polymers are obtained either directly in polymerization, or by way of controlled radical degradation.

The controlled radical degradation process is carried out by using, for example, organic peroxides, such as 2,5-dimethyl-2,5-di(tert-butyl-peroxy)hexane, in the pelletizing stage or directly in the extrusion stage of the fiber production.

The polymers to be used in the compositions of the present invention can be in the form of pellets, or nonextruded particles, such as flakes, or spheroidal particles with a diameter ranging from 0.5 to 4.5 mm. Said nonextruded particles can be coated or impregnated, at least on the surface, with the above mentioned stabilizers (or additives in general) and/or peroxides.

The compositions of the present invention are generally prepared by mechanically blending the olefin polymers with compounds a), b) and c). Said blending is carried out using known techniques, preferably premixing the various components in the solid state (using a Banbury, Henshel, or Loedige mixer, for example), and then extruding the dry blend thus obtained. The extrusion temperatures preferably range from 180° to 260° C.

As an alternative, one can also feed the dry blend directly into the spinneret.

The polyolefin fibers according to the present invention are suitable for various applications, such as the production of woven fabrics, tufted carpets, home-decorating and clothing fabrics, and nonwoven fabrics, obtained by known technologies such as carding/calendering, spun-bonding and melt-blown. By way of example, the nonwovens obtained from the fibers of the present invention, in particular from staple fibers or continuous filament fibers, may be used as backing for carpets.

In order to obtain the polyolefin fibers of the present invention starting with the polymer compositions described above, one can use any spinning process and apparatus known in the art which is adequate for extrusion from melt, such as, for example, continuous filament and continuous bulk yarn, long or short spinning staple, spun-bonding, and melt blown. For instance, the following spinning conditions can be used.

Experimental spinning conditions

Carpet fibers (staple fibers or continuous filament fibers)

The temperature of the extruder and the spinning head (die orifice) ranges from 180° to 260° C., preferably from 180° to 230° C.

The die orifice diameter is 0.6–1.0 mm, and the length/diameter ratio is 5. The die orifice flow-rate is 1–5 g/min., and the yarn count is 20–120 dtex.

The stretching is generally done either in steam (in order to obtain staple fiber), or between rollers heated at temperatures ranging from 115° to 130° C. (to obtain continuous filament fibers), at a stretch ratio from 2.0 to 4.0.

Spun bonded fibers

The extrusion temperature ranges from 180° to 260° C., preferably from 220° to 230° C.; the die orifice diameter is 0.3 to 0.8 mm; the die orifice flow-rate ranges from 0.02 and 1.0 g/min.

Additives such as opacifiers, fillers, and dyes can be added during the spinning process as well.

The yarn count of the fibers of the present invention varies from 0.5 to 10 dtex.

In addition to fibers, the compositions of the present invention are suitable also for the manufacture of thin articles, such as films for example.

The following examples are given in order to illustrate and not limit the present invention.

Tests have been conducted on the fibers of the present invention in order to evaluate the properties of the fibers; the method used for said tests is described below.

Oxygen index ("Limited Oxygen Index" L.O.I.)

This measurement is carried out according to ASTM D 2863-87, using specimens made by preparing a 25 long roving of 650 tex spun fibers; the ends of the roving are fixed to the clamps of a twisting device and after said roving is twisted 80 times it is unclamped making sure that it does not untwist. The two extremities are then united by keeping them between the fingers, thus the two halves of the roving are entwined spontaneously to form a thin rope. After the excess is cut off, said rope is used to measure the L.O.I.

Corrosive property

This is determined by molding the polymer with an iron plate at temperatures ranging from 200° to 260° C. and observing the possible appearance of oxidation products (rust) on the plate which is exposed to a humidity saturated environment at 23° C.

Light resistance: according to ASTM G 27.70.

Filament content: according to ASTM D 1577-79.

EXAMPLES 1, 2, AND 3

Three propylene polymer compositions, having a MFR-L of 12 and $M_w/M_n$ of 6, are prepared by mechanically blending polypropylene with a 1/1 molar complex of dicyandiamide with bismuth tribromide, in quantities of 0.5, 1.0 and 1.5% by weight respectively, and with the following additives (percentages by weight):

0.4% Interox VP 156 poly(1,4-diisopropyl-benzene);

0.2% epoxidized linseed oil;

0.05% Irganox 1010 pentaerythrityl-tetrakis[3-(3,5-di-tert-butyl-4-hydroxy-phenyl)]propionate; and 0.1% Irgafos 168 tris(2,4-di-tert-butylphenyl)phosphite.

The polymer compositions thus prepared have been spun in a laboratory extruder (maximum capacity 5 kg/h) at 220° C., where the orifices of the die have a diameter of 1.0 mm and the orifice flow-rate is 3 g/min.

The fibers obtained in this manner are stretched into staple using a stretch ratio of 3.

The L.O.I. values determined on the fibers obtained this way are 26.5, 30.0 and 33.0 respectively.

EXAMPLE 4

A propylene polymer composition, having a MFR-L of 12 g/10 min and $M_w/M_n$ of 6, is prepared by mechanical blend of a polypropylene with (percentage by weight):

1.0% of 1/1 molar complex of dicyandiamide with bismuth tribromide;

0.40% Interox VP 156 poly(1,4-diisopropyl-benzene);

0.20% epoxidized linseed oil;

0.15% Irganox B 215 (one part tris(2,4-di-tert-butyl)phosphite and two parts tetrakis[methylene(3,5-di-tert-butyl-4-hydroxycinnamate)]methane; 0.50% benzophenone;

0.50% benzotriazole;

0.15% $TiO_2$.

The polymer composition thus obtained was spun using the following operating conditions:

spinning rate: 650 m/min;

spinning temperature: 220° C.;

die orifice diameter: 1 mm;

die orifice flow-rate: 2.84 g/min.

stretch ratio: 1:3.35.

The fiber was crimped, cut and tested to evaluate the oxygen index and resistance to light: the L.O.I. value was 28.0, while the resistance to light was 320 hours (the tenacity was halved after 320 hours).

Subsequently the fibers were processed to make a tufted rug with alumina trihydrate fireproof backing. Said carpet withstood the following flame resistance tests:

pill test, according to ASTM D 2859-70 T;

hot metal nut test, according to BS 4780/BS 5287;

CSE RF 2/75 (rules of the Italian Department of the Interior regarding flooring materials);

CSE RF 3/77 (rules of the Italian Department of the Interior regarding flooring materials);

cone calorimeter, according to ISO DIS 5660.

EXAMPLE 5

A propylene polymer composition, having a MFR-L of 35 g/10 min. and $M_w/M_n$ of 3.5, is prepared by mechanical blend of polypropylene with (percentage by weight):

1.0% dicyandiamide bismuth tribromide;

0.40% Interox VP 156 poly(1,4-diisopropyl-benzene);

0.20% epoxidized linseed oil;

0.15% Irganox B 215 (one part tris(2,4-di-tert-butyl)phosphite and two parts tetrakis[methylene(3,5-di-tert-butyl-4-hydroxycinnamate)]methane.

The polymer composition thus obtained was spun using the following operating conditions:

spinning rate: 1800 m/min;

spinning temperature: 220° C.;

die orifice diameter: 0.6 mm;

die orifice flow-rate: 0.6 g/min.

The L.O.I. of the resulting fiber was 28.0.

The fibers of Examples 1 to 5 did not promote the formation of rust when subjected to the corrosion test.

Comparative Example 1

A polymer composition is prepared and spun as described in Example 1, except that the composition contains 0.2% of calcium stearate instead of the epoxidized linseed oil. The corrosion test carried out on the obtained fibers shows that considerable rust develops with its use. The oxygen test shows a L.O.I. value of 26.

Comparative Example 2

A polymer composition is prepared and spun as described in Example 1, except that the composition contains 0.4% of a 1,4-diisopropyl benzene monomer instead of the corresponding oligomer.

The oxygen index test carried out on the obtained fibers shows a L.O.I. value about 20% lower than that of Example 1. Moreover, during the spinning process some foul smelling gas developed.

Other features, advantages and embodiments of the invention disclosed herein will be readily apparent to those exercising ordinary skill after reading the foregoing disclosure. In this regard, while specific embodiments of the invention have been described in considerable detail, variations and modifications of these embodiments can be effected without departing from the spirit and scope of the invention as described and claimed.

We claim:

1. An olefin polymer composition comprising:

(a) from 0.3 to 3% of a complex of formula:

R.(MeX$_3$)$_y$ wherein R is an amine selected from the group consisting of dicyandiamide, guanamine, 2-guanidinoimidazole, melamine, isophoronediamine, and piperazine, which are optionally substituted with an alkyl, aryl or acyl group, and compounds containing from 2 to 9 triazine rings either condensed or bonded to one another with at least one —NH group; Me is bismuth or antimony; X is chlorine or bromine; y is a number from 0.3 to 4.0;

(b) from 0.1 to 1% of poly(1,4-diisopropylbenzene) of formula:

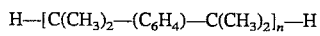

where n is a number from 3 to 7;

(c) from 0.1 to 0.5% of an organic epoxide; the balance to 100% being an olefin polymer, wherein all percentages are based on the total weight of the composition.

2. The composition of claim 1, wherein the olefin polymer is selected from the group consisting of:

1) isotactic propylene homopolymers, having an isotactic index of at least 90;

2) random copolymers of propylene and at least one comonomer selected from the group consisting of ethylene and $C_4$–$C_8$ α-olefins, having an isotactic index of at least 35;

3) heterophasic polymers comprising:
   A) from 10 to 60 parts by weight of a Fraction A comprising propylene polymer material selected from the group consisting of propylene homopolymer, a copolymer of propylene with ethylene and a copolymer of propylene with a $C_4$–$C_8$ α-olefin containing more than 80% of propylene, said propylene polymer material having an isotactic index higher than 80;
   B) from 3 to 25 parts of a Fraction B comprising a semicrystalline copolymer fraction of ethylene, insoluble in xylene at ambient temperature; and
   C) from 15 to 87 parts of a Fraction C comprising a copolymer fraction of ethylene with at least one comonomer selected from the group consisting of propylene and a $C_4$–$C_8$ α-olefin, and optionally minor quantities of diene, said copolymer fraction being soluble in xylene at ambient temperature, and containing from 20 to 60% of ethylene or of a $C_4$–$C_8$ α-olefin, or of a combination thereof;

4) a blend of at least two members selected from the group consisting of Fraction A, Fraction B and Fraction C.

3. The composition of claim 1, wherein y in the formula of complex (a) is 1.

4. The composition of claim 1, wherein the organic epoxide is an epoxidized oil.

* * * * *